Sept. 7, 1948.   G. W. PURDY   2,448,547
COUPLING FOR RODS, CABLES AND THE LIKE
Filed Aug. 6, 1943
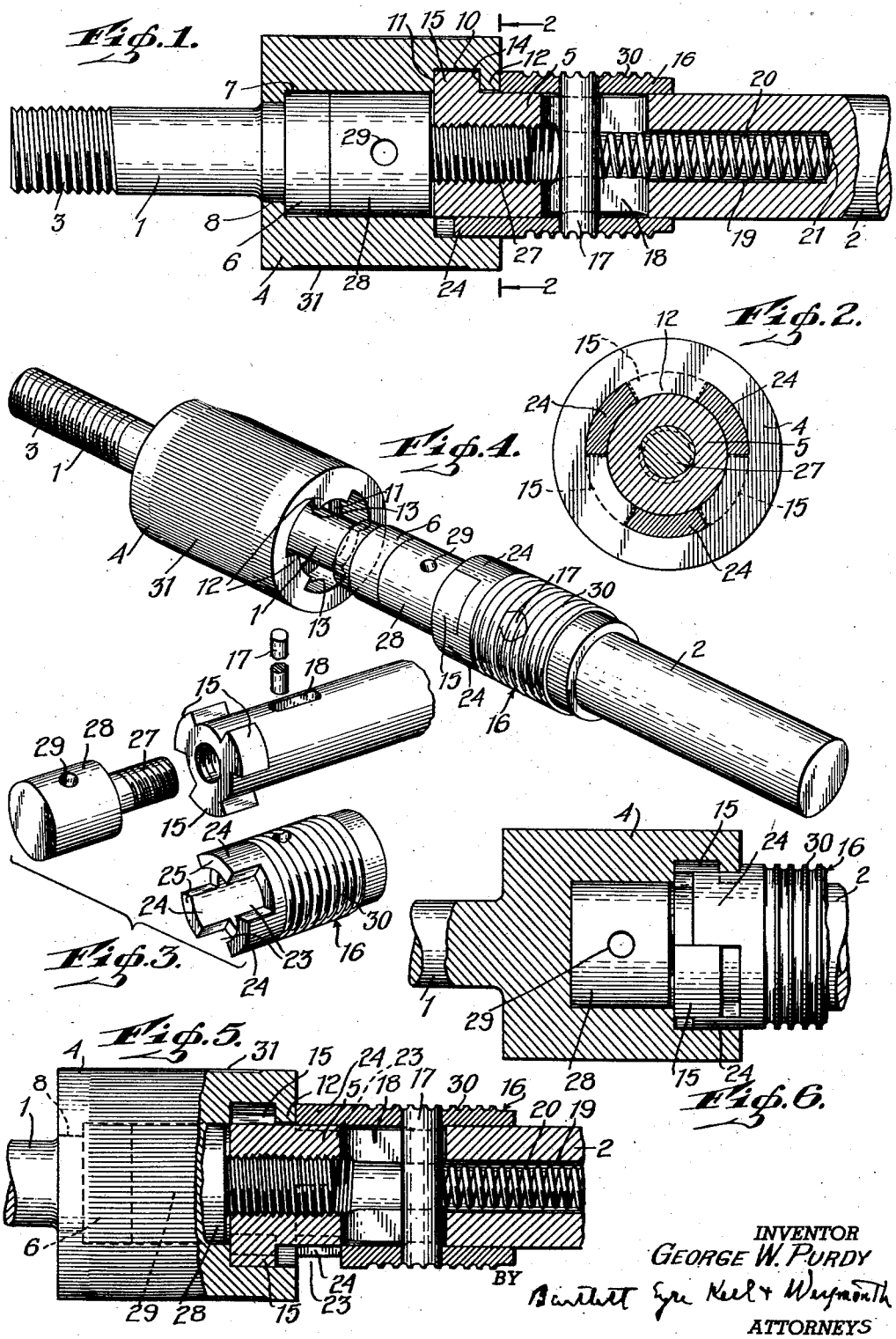
INVENTOR
GEORGE W. PURDY
BY Bartlett Eyre Keel & Weymouth
ATTORNEYS Patented Sept. 7, 1948

2,448,547

UNITED STATES PATENT OFFICE 2,448,547

COUPLING FOR RODS, CABLES, AND THE LIKE

George W. Purdy, Laurelton, N. Y.

Application August 6, 1943, Serial No. 497,612

13 Claims. (Cl. 287—103)

This invention relates to readily attachable and separable couplings for rods, cables and the like.

One object of the invention is a coupling of the above indicated character which is characterized by its simplicity in construction and manipulation and the economy with which it may be manufactured on a quantity production basis.

A further object of the invention is a coupling of the above indicated character of novel and improved construction whereby two elements of a rod, cable or the like may be readily coupled and uncoupled without the necessity of relative lengthwise displacement or movement of the elements or sections.

A further object of the invention is a coupling of the above indicated character of novel and improved construction for coupling sections of rods, etc., together without the necessity of relative rotary movements of the sections.

A further object of the invention is a coupling of the above indicated character of novel and improved construction whereby sections of a rod, cable or the like may be coupled and uncoupled without either relative rotation of the sections or relative lengthwise movements thereof.

A further object of the invention is a coupling of the above indicated character which is characterized by the novel and improved construction for transmitting both longitudinal and rotary power.

Further objects of the invention will hereinafter appear.

For a better understanding of the invention, reference may be had to the accompanying drawings forming a part of this application, wherein—

Fig. 1 is a longitudinal sectional view through a coupling embodying the invention, with certain parts shown in elevation;

Fig. 2 is a section on the line 2—2 of Fig. 1;

Fig. 3 is an exploded view showing certain of the coupling parts;

Fig. 4 is a perspective view illustrating how the abutting sections of the members to be coupled may be readily coupled or uncoupled for the transmission of movements or power;

Fig. 5 is a view, partly in elevation and partly in section, illustrating a relative position of the parts during the coupling operation; and Fig. 6 shows a modification of the coupling.

Referring to the modification of Figs. 1 to 5, I have illustrated my invention as embodied in a coupling comprising sections 1 and 2 of a rod, cable or other elements to be coupled together for transmission of movements and power longitudinally of the sections. These sections 1 and 2 may be coupled to other sections, omitted from the drawings, in any suitable manner. One of the sections 1 and 2 may, if desired, be provided with a screw-threaded part for connection with other sections, and in the particular embodiment shown the section 1 is provided with a screw-threaded part 3 for this purpose. The section 2 is indicated as being broken off and it is understood that this section is fastened to the adjacent part in any suitable manner.

In the particular embodiment shown, the section 1 carries a female coupling member or part 4 while the section 2 is provided with the male part 5. The female part 4 is in the form of a sleeve which is movable lengthwise on the section 1 in the uncoupled position in one direction. It is provided with a cylindrical bore for accommodating a piston-like head 6 formed on the end of the section 1 and engaging a shoulder 7 formed in the cylindrical part 4. The section 1 and the part 4 are retained against angular movements with respect to each other by a fairly close fitting engagement of the piston 6 with the interior of the cylindrical bore formed in the part 4 and, in the particular embodiment shown, the section 1 is provided with a fairly close fitting with the opening 8 formed by the annular shoulder 7. With the sections 1 and 2 uncoupled and out of alinement with each other, the section 1 and the female part 4 may be assembled and disassembled by relative longitudinal movements therebetween, the section 1 passing through the right-hand end of the sleeve part 4.

The female part 4 is also provided with a detachable coupling means at its righthand end. For this purpose an annular channel 10 is formed interiorly of the sleeve at a point adjacent the right-hand end, the inner wall of this channel being indicated at 11 and being continuous all the way around the sleeve. The channel 10 is spaced from the righthand end of the sleeve a distance equal to the thickness of two or more lugs 12, the inner surfaces of which lugs 12 form the outer wall of the channel 10. In the particular embodiment there are three such lugs 12 which are equally spaced from each other a distance of 60° and each of the lugs covering an arc of approximately 60°. These lugs 12 have radially disposed bearing surfaces 13 which cooperatively function with corresponding lugs on the section 2 to transmit rotary motion between the part 4 and part 5 while the inner surfaces 14 of these lugs 12 and the surface 11 cooperatively function with other corresponding lugs on the section 2 to transmit longitudinal motion from one section to the other.

The male part 5 is provided on its left hand end with lugs 15 corresponding in shape and number with the lugs 12. These lugs 15 are equally spaced from each other and in the particular embodiment shown there are three such lugs covering arcs of 60°. These lugs 15 have a longitudinal length or width of substantially the width of the channel 10 so as to make a reasonably close fit therein but sufficiently loose to pass rearwardly back of the lugs 12 when the parts 4 and 5 are moved through an angle sufficient to bring this about. The male part 5 includes a sleeve 16 closely surrounding it. This sleeve 16 carries a pin 17 which passes transversely therethrough and terminates at either end at the periphery of the sleeve. The male part 5 is provided with a longitudinally extending slot 18 through which this pin 17 passes, and the sleeve 16 and the male part 5 therefore have a relative movement coextensive with the length of this slot 18. The male part 5 is also provided with a central interior chamber 19 and a coil spring 20 is disposed therein with one end engaging the end wall 21 of this chamber and the other end engaging the pin 17 and thereby holding the pin 17 and the sleeve 16 over to the lefthand position illustrated (Fig. 1). This sleeve 16 is provided with 60° arc slots 23 corresponding to the sizes and shape of the lugs 12 of the female member and in which slots are accommodated such lugs 12 when the parts are coupled. Alternating with these slots are lugs 24 whose end surfaces 25 are flush with the end surfaces of the lugs 15, or approximately flush with such surfaces, while the inner surfaces of the slots 23, in the uncoupled position of the coupling, engage the end surfaces of the lugs 15, or approximately so, depending upon whether the slot 18 is sufficiently long to permit this to take place. These inner surfaces of the slots 23 engage the outer surfaces of the lugs 12 in the coupled position. The sleeve 16 thus has a limited longitudinal movement relatively to the male member 5 but there is no relative rotary movement. The chamber 19 formed in the male part 5 is provided at the outermost portion thereof with screw-threads for the accommodation of an externally screw-threaded stem 27 of a play compensating adjusting piston 28. This piston 28 fits snugly within the bore of the female member 4 or is preferably approximately the same diameter as the bore to function with the other parts of the coupling toward preventing lateral play. The arrangement is such that with the lugs 15 of the male member 5 locked in the channel 10 back of the lugs 12, the piston 28 is in engagement with, or approximately in engagement with, the piston element 6 so as to avoid any appreciable longitudinal play in the coupling. This piston 28 is provided with an opening 29 therethrough for the purpose of accommodating an instrument by which the piston 28 may be accurately adjusted by screwing the stem 27 inwardly and outwardly within the screw-threaded portion of the opening or chamber 19. The sleeve 16 is provided with circular indentures or corrugations 30 to facilitate movement of the sleeve against the tension of the spring 20. The female part or sleeve 4 is provided with an outer knurled surface 31 for facilitating the manipulation of the sleeve by the fingers. With the sections 1 and 2 coupled together for transmission of longitudinal movements, the lugs 15 of the male member are disposed in the channel 10 and in line with and back of the lugs 12 while the lugs 24 are disposed in the arcuate slots provided between the lugs 12. Fig. 1 shows the coupled position. With the sections 1 and 2 thus coupled, there is no appreciable longitudinal play between them, since the compensating adjustable piston 28 has been adjusted so as to have no appreciable play or gap between the two pistons 6 and 28. Any longitudinal play there may be between the channel 10 and the lugs 15 and the lugs 12 may be compensated for by the adjustment of the piston 28.

The uncoupling and coupling between the sections 1 and 2 may be effected very easily and with the greatest facility. To uncouple the sections it is only necessary to slide the sleeve 16 against the tension of the spring 20 far enough away from the female member 4 to withdraw the lugs 24 from the arcuate slots formed between the lugs 12, and then by relative rotation of the female member 4 and the male member 5, the lugs 15 are brought into alinement with these slots to permit withdrawal therethrough, whereby the sections are wholly uncoupled. This, as indicated, may be effected with the greatest facility and only two hands are required, it being only necessary to manipulate the sleeve 16 and the female member 4. The coupling operation is substantially the reverse of that operation. In this case the male member 5 and the female member 4 are caused to abut against each other with the flush surfaces of the lugs 15 and 24 bearing against the lugs 12, and with the lugs 15 in alinement with the slots between the lugs 12. With the parts thus alined and longitudinal pressure applied sufficient to compress the spring 20, the lugs 15 will pass through the slots between the lugs 12 and enter the channel 10, whereupon relative rotation of the parts 4 and 5 will result in the lugs 15 passing back of the lugs 12 and the lugs 24 snapping into the slots between the lugs 12 to firmly lock the parts in coupled position for transmission of longitudinal movements. In the coupling operation it is only necessary simultaneously to apply relative rotary movement and relative longitudinal pressure between the members 4 and 5 since upon the alinement of the lugs 24 and the lugs 12, the pressure will result in the compression of the spring 20 and the entry of the lugs 15 into the slots between the lugs 12, and with a further relative rotary movement the lugs 24 snap into the slots between the lugs 12.

An additional advantage of this coupling is that the sections 1 and 2 may be coupled and uncoupled while abutting each other endwise without the necessity of the separation thereof. This is indicated in Fig. 4, where the compensating piston 28 is abutting against the piston 6. The female part or sleeve 4 is, in the uncoupled position moved far enough to clear the lugs 15. In this position it is only necessary to press the female part 4 against the lugs 15 and 24 while at the same time imparting rotary movement to the sleeve. The lugs 12 in this operation, as above described, will engage the lugs 24 when in alinement and move the sleeve 16 against the tension of the spring 20, thereby permitting the lugs 15 to enter the channel 10, whereupon further rotary movement of the sleeve part 4 will cause the lugs 15 to lock behind the lugs 12, and the lugs 24 to enter between the slots of the lugs 12. Fig. 5 indicates the position where the spring 20 has been compressed to cause the lugs 15 to enter the channel 10 and just before the rotary movement of the part 4 to cause the lugs 24 to snap under the tension of the spring 20 into the locking slots between the lugs 12.

In the embodiment of Figs. 1 to 4, rotary movement is transmitted between the parts 4 and 5 as well as longitudinal movement in the coupling position. If it is desired, therefore, to transmit rotary motion between the sections 1 and 2, it is only necessary to make the section 1 integral with the part 4 as shown in Fig. 6. With this construction the coupling is adapted to the transmission of power, both longitudinally and rotatably.

Certain advantages of my invention are present when a lesser or greater number of equally spaced lugs 12, 15 and 24 are present but I have found that best results are obtained when there are three of each group of lugs spaced approximately 60° apart and covering arcs of approximately 60°.

I claim:

1. A coupler for rods, cables and the like comprising a female member having a channel formed interiorly thereof near one end with a multiplicity of inwardly projecting arcuate shaped lugs, said lugs forming one side of the channel and a part of the end surface of the female member and a male member having a multiplicity of fixed lugs corresponding in shape, position and size to the lugs of said female member which pass through the slots between the lugs of the female member and enter the channel and when locked being disposed behind the lugs of the female member and said male member having longitudinally movable lugs movable as a unit and having widths corresponding to the widths of the slots and the last-named lugs being biased to occupy positions between the first-named lugs when the parts are coupled together, said female member having an end surface flush with the end surfaces of said lugs carried thereby and the lugs of said male member having flush end surfaces for engaging the lugs of the female member.

2. A coupler for rods, cables and the like comprising a female member having a channel formed interiorly thereof near one end with a multiplicity of inwardly projecting arcuate shaped lugs, said lugs forming one side of the channel and a part of the end surface of the female member and a male member having a multiplicity of fixed lugs corresponding in shape, position and size to the lugs of said female member which pass through the slots between the lugs of the female member and enter the channel and when locked being disposed behind the lugs of the female member and said male member having longitudinally movable lugs movable as a unit and the last-named lugs being biased to occupy positions between the first-named lugs when the parts are coupled together, said female member having an end surface flush with said lugs carried thereby and the lugs of said male member having a flush end surface for engaging the lugs of the female member, one of said members having an adjustable extension on the end thereof which is adjustable to compensate for longitudinal relative motion of the members.

3. A coupler for rods, cables and the like comprising a female member having a channel formed interiorly thereof near one end with a multiplicity of inwardly projecting arcuate shaped lugs, said lugs forming one side of the channel and the end surface of the female member and a male member having a multiplicity of fixed lugs corresponding in shape, position and size to the lugs of said female member which pass through the slots between the lugs of the female member and enter the channel and when locked being disposed behind the lugs of the female member and said male member having longitudinally movable lugs movable as a unit and the last-named lugs being biased to occupy positions between the first-named lugs when the parts are coupled together, said female member having an end surface flush with said lugs carried thereby and the lugs of said male member having a flush end surface for engaging the lugs of the female member, one of said members being mounted for swivelling movements with respect to the other member.

4. A coupler for rods, cables and the like comprising a female member having a channel formed interiorly thereof near one end with a multiplicity of inwardly projecting arcuate shaped lugs, said lugs forming one side of the channel and the end surface of the female member and a male member having a multiplicity of fixed lugs corresponding in shape, position and size to the lugs of said female member which pass through the slots between the lugs of the female member and enter the channel and when locked being disposed behind the lugs of the female member and said male member having longitudinally movable lugs movable as a unit and the last-named lugs being biased to occupy positions between the first-named lugs when the parts are coupled together, said female member having an end surface flush with said lugs carried thereby and the lugs of said male member having a flush end surface for engaging the lugs of the female member, said members being rigidly fastened to the rods and the like to be coupled.

5. A coupling for rods and the like comprising a female member having an annular channel formed interiorly thereof near one end and having a multiplicity of inwardly extending arcuate shaped lugs equally spaced and alternating with slots therebetween, a cooperating male member having a multiplicity of lugs corresponding in shape and size and equally spaced with respect to the lugs of the female member, said male member having a longitudinally slidable sleeve carrying relatively movable lugs alternating with the relatively fixed lugs thereon and occupying the slots therebetween, said male member having an elongated interior chamber and a transverse elongated slot extending therethrough, and a spring disposed in said chamber and biasing said sleeve into locking and coupling position, said sleeve having a pin passing through the slot for limiting the sliding movement of the sleeve.

6. A coupling for rods and the like comprising a female member having an annular channel formed interiorly thereof near one end and having a multiplicity of inwardly extending arcuate shaped lugs equally spaced and alternating with slots therebetween, a cooperating male member having a multiplicity of lugs corresponding in shape and size and equally spaced with respect to the lugs of the female member, said male member having a longitudinally slidable sleeve carrying relatively movable lugs alternating with the relatively fixed lugs thereon and occupying the slots therebetween, said male member having an elongated interior chamber and a transverse elongated slot extending therethrough, and a spring disposed in said chamber and biasing said sleeve into locking and coupling position, said sleeve having a pin passing through the slot for limiting the sliding movement of the sleeve, said male member and said female member having flush surfaces including the surfaces of said lugs.

7. A coupling for rods and the like comprising a female member having an annular channel formed interiorly thereof near one end and having a multiplicity of inwardly extending arcuate shaped lugs equally spaced and alternating with slots therebetween, a cooperating male member having a multiplicity of lugs corresponding in shape and size and equally spaced with respect to the lugs of the female member, said male member having a longitudinally slidable sleeve carrying relatively movable lugs alternating with the relatively fixed lugs thereon and occupying the slots therebetween, said male member having an elongated interior chamber and a transverse elongated slot extending therethrough, and a spring disposed in said chamber and biasing said sleeve into locking and coupling position, said sleeve having a pin passing through the slot for limiting the sliding movement of the sleeve and one of said members having an adjustable abutting extension or abutment for taking up longitudinal play.

8. A coupler for coupling together sections of rods, cables and the like comprising a pair of relatively rotatable coupling members, the coupling members having cooperating coupling portions which are capable of engagement one behind the other when the members are brought together and relatively rotated, a separate longitudinally adjustable abutting member carried by one of the members and capable of longitudinal adjustment to engage the other member and thereby prevent relative play between said sections when the coupling members are in the coupled position, and means for locking the members against relative rotation while so coupled.

9. A coupler of the character set forth comprising a member having a fixed locking lug and a slot adjacent thereto and a second member having two lugs whose end surfaces are approximately flush with each other in the uncoupled position, one of said last-named lugs being movable and being biased and occupying said slot in the coupled position, and the other of said lugs occupying a position behind the first-named lug in the locked position and means for preventing relative play between the members in the coupled position comprising a separate longitudinally adjustable abutting member carried by one of said members for engaging the other of said members.

10. A coupler of the character set forth comprising a female member having a fixed coupling lug and a slot adjacent thereto and a male member having a sleeve and a coupling lug and a locking lug whose end surfaces are substantially flush, said last-named coupling lug being adapted to pass through said slot and occupy a position behind and engaging the first-named lug in the coupled and locked position and said locking lug extending into said slot in the coupled position, said locking lug being carried by said movable sleeve and having limited relative movement on the male member and being biased toward the limiting position, and the coupling lug and the locking lug of said male member having outer curved surfaces which are flush with each other.

11. A coupler for rods, cables and the like comprising a female member having a channel formed near one end on the interior thereof with a multiplicity of alternating lugs and slots disposed between the channel and the end of the member and a male member having a multiplicity of alternating lugs and slots corresponding to the lugs and slots of the female member, the lugs of the male member being adapted to pass through the slots of the female member and to be rotated in the channel to positions behind and engaging the lugs of the female member, a sleeve mounted on said male member and behind the lugs thereof, said sleeve having slots and lugs alternating with the slots and lugs of the male member with the circumferential dimensions of the slots of the sleeve being co-extensive with the circumferential dimensions of the lugs of the male member, spring means mounted on said male member and biasing said sleeve to a position with its lugs disposed in the slots of the male member, the lugs of the sleeve member occupying the slots of the female member in the coupled position, the outer circumference of the lugs of the sleeve member forming continuations of the outer circumference of the lugs of the male member.

12. A coupler for rods, cables and the like comprising a female member having a channel formed near one end on the interior thereof with a multiplicity of alternating lugs and slots disposed between the channel and the end of the member and a male member having a multiplicity of alternating lugs and slots corresponding to the lugs and slots of the female member, the lugs of the male member being adapted to pass through the slots of the female member and to be rotated in the channel to positions behind and engaging the lugs of the female member, a sleeve mounted on said male member and behind the lugs thereof, said sleeve having slots and lugs alternating with the slots and lugs of the male member with the circumferential dimensions of the slots of the sleeve being co-extensive with the circumferential dimensions of the lugs of the male member, spring means mounted on said male member and biasing said sleeve to a position with its lugs disposed in the slots of the male member, the lugs of the sleeve member occupying the slots of the female member in the coupled position, the outer circumference of the lugs of the sleeve member forming continuations of the outer circumference of the lugs of the male member and said male member and sleeve being provided with means for arresting the relative movement of the sleeve in a position where the end surfaces of the lugs of the male member and the lugs of the sleeve are substantially flush with each other.

13. A coupler for rods, cables and the like comprising a female member having a channel formed near one end on the interior thereof with a multiplicity of alternating lugs and slots disposed between the channel and the end of the member and a male member having a multiplicity of alternating lugs and slots corresponding to the lugs and slots of the female member, the lugs of the male member being adapted to pass through the slots of the female member and to be rotated in the channel to positions behind and engaging the lugs of the female member, a sleeve mounted on said male member and behind the lugs thereof, said sleeve having slots and lugs alternating with the slots and lugs of the male member with the circumferential dimensions of the slots of the sleeve being co-extensive with the circumferential dimensions of the lugs of the male member, spring means mounted on said male member and biasing said sleeve to a position with its lugs disposed in the slots of the male member, the lugs of the sleeve member occupying the slots of the female member in the coupled position, the male member and the sleeve being provided with means for arresting the relative movement of the sleeve in the locking direction of movement and thereby preventing the separation of the sleeve from the male member.

GEORGE W. PURDY.

REFERENCES CITED

The following references are of record in the file of this patent:

UNITED STATES PATENTS

| Number | Name | Date |
|---|---|---|
| 569,995 | Boyd | Oct. 27, 1896 |
| 587,855 | Park | Aug. 10, 1897 |
| 1,079,881 | Reagles | Nov. 25, 1913 |
| 1,127,022 | Knight | Feb. 2, 1915 |
| 1,645,428 | Hosmer et al. | Oct. 11, 1927 |
| 2,135,812 | Gray | Nov. 8, 1938 |

FOREIGN PATENTS

| Number | Country | Date |
|---|---|---|
| 17,691 | Great Britain | Sept. 1, 1905 |